US011613361B2

(12) United States Patent
Koustubhan et al.

(10) Patent No.: US 11,613,361 B2
(45) Date of Patent: Mar. 28, 2023

(54) VERTICAL ADJUSTMENT SYSTEM FOR AN AIRCRAFT SEAT

(71) Applicant: B/E Aerospace, Inc., Winston-Salem, NC (US)

(72) Inventors: Arjun Koustubhan, Hyderabad (IN); Michael L. Oleson, Parkland, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 202 days.

(21) Appl. No.: 17/338,037

(22) Filed: Jun. 3, 2021

(65) Prior Publication Data
US 2022/0340284 A1    Oct. 27, 2022

(51) Int. Cl.
*B64D 11/06* (2006.01)
*B60N 2/16* (2006.01)

(52) U.S. Cl.
CPC .......... *B64D 11/0639* (2014.12); *B60N 2/164* (2013.01); *B60N 2/1665* (2013.01); *B64D 11/0696* (2013.01)

(58) Field of Classification Search
CPC ... B64D 11/0639; B60N 2/164; B60N 2/1665
See application file for complete search history.

(56) References Cited

U.S. PATENT DOCUMENTS

| 5,299,771 | A | 4/1994 | White et al. |
| 9,493,242 | B2 | 11/2016 | Oleson |
| 2006/0108848 | A1 | 5/2006 | Williamson et al. |
| 2009/0127908 | A1 | 5/2009 | Kucharski et al. |
| 2015/0375638 | A1 | 12/2015 | Farooq et al. |
| 2020/0001748 | A1 * | 1/2020 | Antoniuk ............... B60N 2/165 |

FOREIGN PATENT DOCUMENTS

| CN | 112298574 | A |  | 2/2021 |  |
| EP | 4079636 | A1 | * | 10/2022 | ......... B64D 11/0639 |
| FR | 2759648 | B1 |  | 3/1999 |  |
| GB | 2322295 | A |  | 8/1998 |  |
| GB | 2544076 | A | * | 5/2017 | ........... B60N 2/0715 |
| KR | 200125229 | Y1 |  | 9/1998 |  |

OTHER PUBLICATIONS

Extended Search Report in European Application No. 22167211.6 dated Sep. 19, 2022, 6 pages.

* cited by examiner

*Primary Examiner* — Timothy J Brindley
(74) *Attorney, Agent, or Firm* — Suiter Swantz pc llo

(57) ABSTRACT

A vertical adjustment system for an aircraft seat is disclosed. The vertical adjustment system may include an actuation assembly. The actuation assembly may include an actuator configured to provide a vertical height adjustment for the aircraft seat. The actuation assembly may include a release mechanism configured to couple to a rotatory portion of the swivel plate. The actuation assembly may include a plurality of vertical stabilizer rods coupled to a portion of the tracking plate. The actuation assembly may include a pillow block assembly. The pillow block assembly may include a plurality of pillow blocks coupled to a portion of the swivel plate. The pillow block assembly may include a plurality of rollers coupled to a portion of the plurality of pillow blocks. The plurality of rollers may be configured to provide stability along the vertical stabilizer rods when the actuator provides the vertical height adjustment.

15 Claims, 16 Drawing Sheets

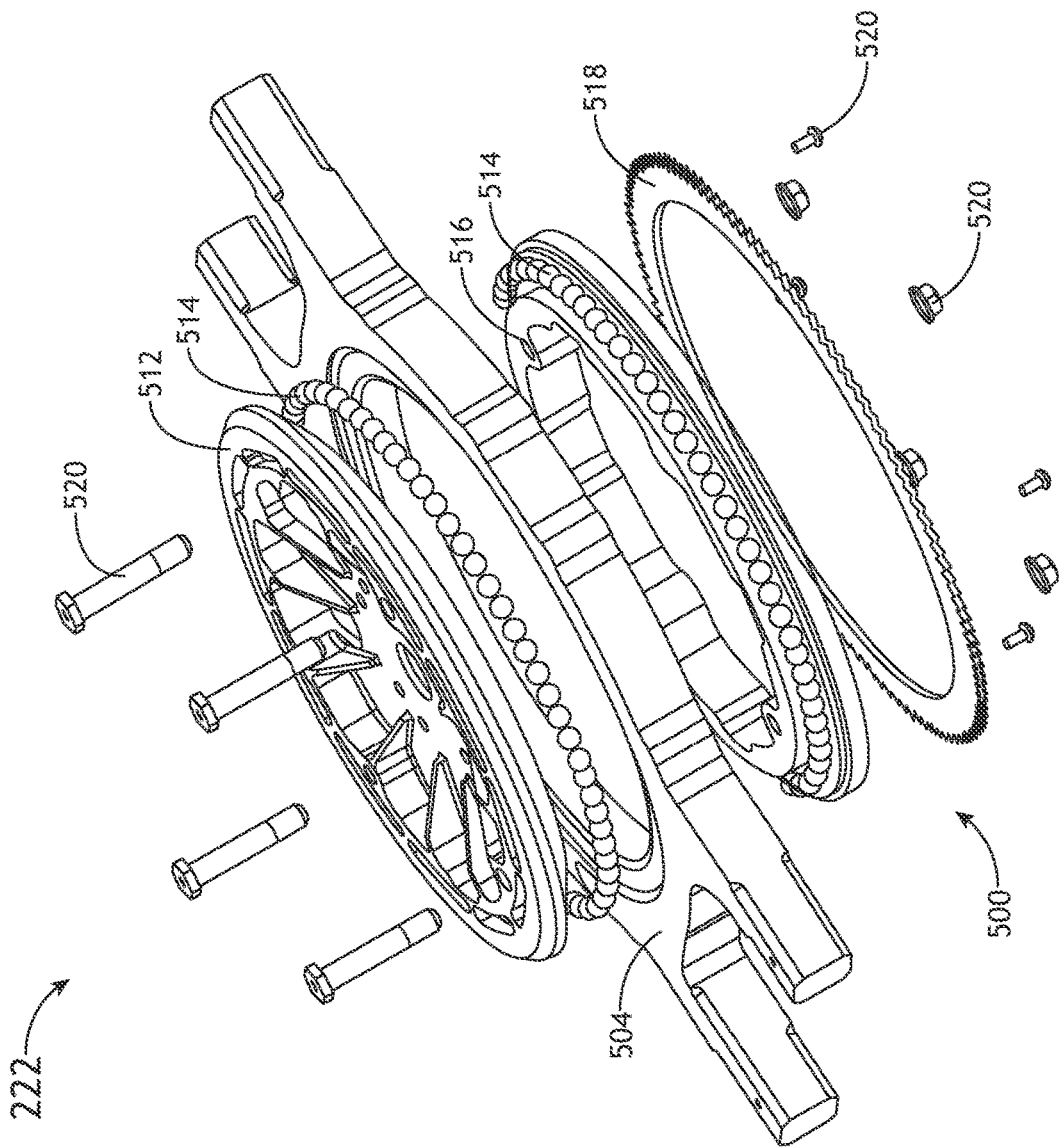

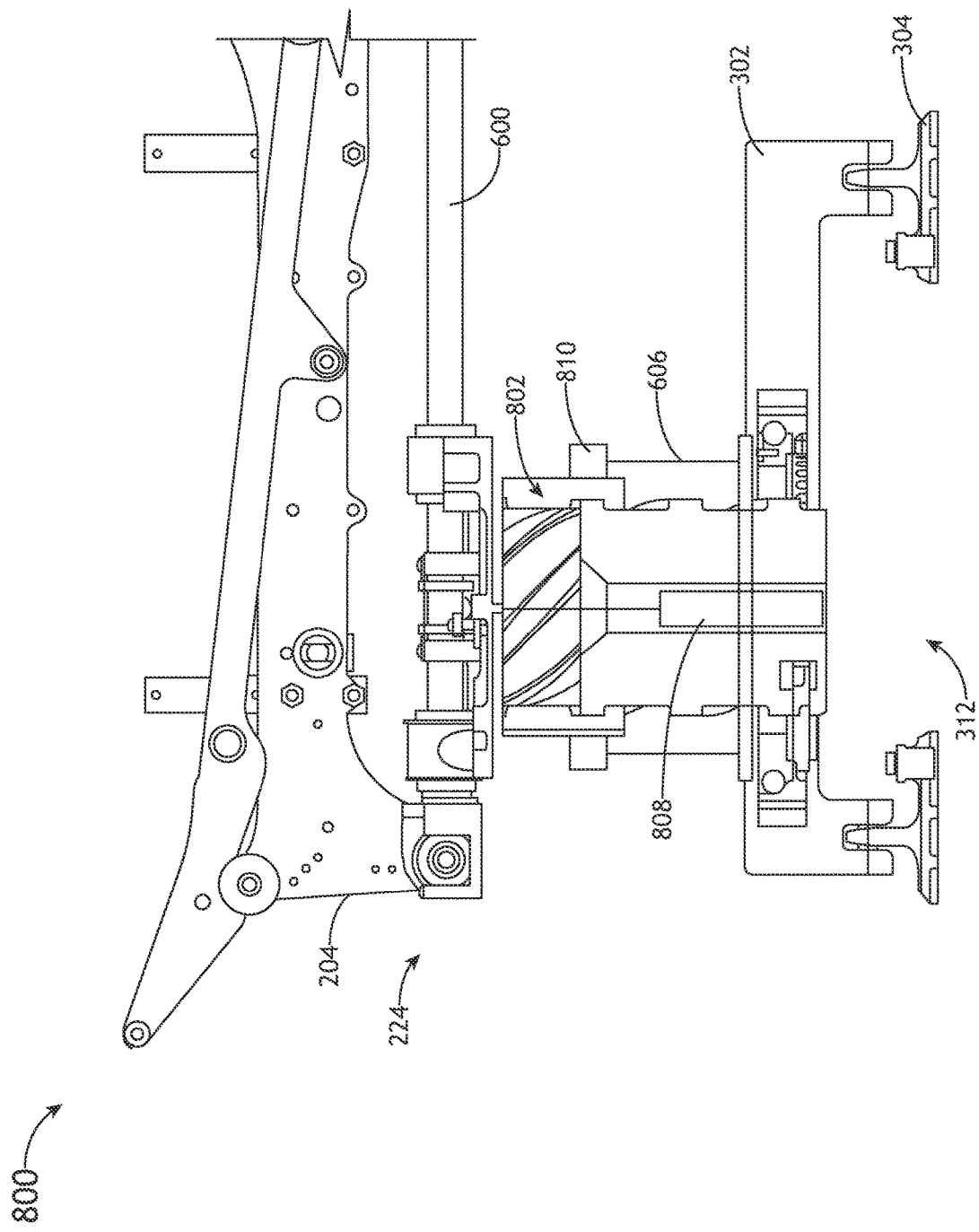

VERTICAL ADJUSTMENT SYSTEM FOR AN AIRCRAFT SEAT

CROSS-REFERENCE TO RELATED APPLICATION

The present application claims the benefit under to India Provisional Patent Application No. 202141018639, filed Apr. 22, 2021, entitled VERTICAL ADJUSTMENT SYSTEM FOR AN AIRCRAFT SEAT, naming Arjun Koustubhan and Michael Oleson as inventors, which is incorporated by reference in the entirety.

BACKGROUND

Often it is desirable to have an aircraft seat configured with one or more comfort features for a passenger to adjust as necessary. One feature that is lacking in conventional aircraft seats is the ability to adjust a vertical height of the aircraft seat.

SUMMARY

A vertical adjustment system for an aircraft seat is disclosed, in accordance with one or more embodiments of the disclosure. In one embodiment, the system includes a swivel assembly. In another embodiment, the swivel assembly includes a swivel plate including integrally-formed connecting members, the integrally-formed connecting members configured to couple to a portion of the aircraft seat; and a swivel mechanism configured to rotate the aircraft seat about a central axis of the aircraft seat. In another embodiment, the system includes a tracking assembly. In another embodiment, the tracking assembly includes a plurality of slide tubes configured to slide the aircraft seat one of side-to-side or fore-and-aft; a plurality of slide bearings configured to receive a portion of the plurality of slide tubes; and a tracking plate coupled to the plurality of slide bushings. In another embodiment, the system includes an actuation assembly. In another embodiment, the actuation assembly includes an actuator configured to provide a vertical height adjustment for the aircraft seat. In another embodiment, the actuator is configured to arrest relative motion between a base assembly of the aircraft seat and an upper portion of the aircraft seat. In another embodiment, the actuation assembly includes a release mechanism configured to couple to a rotatory portion of the swivel plate and configured to release the actuator. In another embodiment, the actuation assembly includes a plurality of vertical stabilizer rods coupled to a portion of the tracking plate. In another embodiment, the actuation assembly includes a pillow block assembly. In another embodiment, the pillow block assembly including a plurality of pillow blocks coupled to a portion of the swivel plate. In another embodiment, the pillow block assembly includes a plurality of rollers coupled to a portion of the plurality of pillow blocks, the plurality of rollers configured to receive a portion of the plurality of stabilizer rods, the plurality of rollers configured to provide stability along the vertical stabilizer rods when the actuator provides the vertical height adjustment.

In some embodiments, the swivel mechanism may include the swivel mechanism may include a first inner ring; an additional inner ring, the swivel plate positioned between the first inner ring and the additional inner ring; one or more ball bearings, the one or more ball bearings positioned between the swivel plate and at least one of the first inner ring or the additional inner ring; and a locking ring, the locking ring include one more teeth to arrest the relative motion between the swivel plate and at least one of the first inner ring or the additional inner ring.

In some embodiments, the swivel mechanism may include a helix swivel mechanism and a locking mechanism configured to engage the helix swivel mechanism to lock the aircraft seat in a select position. The helix swivel mechanism may include a shaft. The shaft may include one or more helical protrusions.

In some embodiments, the release mechanism may include a pull lever coupled to a portion of the swivel plate and one or more pull cables coupled to a portion of the pull lever, the one or more pull cables configured to pull the pull lever to release the actuator.

In some embodiments, the integrally-formed connecting members may be configured to couple to a portion of seat frame of the aircraft seat.

In some embodiments, the tracking assembly may be configured to couple to a portion of the base assembly of the aircraft seat.

In some embodiments, the integrally-formed connecting members may be configured to couple to a portion of base assembly of the aircraft seat.

In some embodiments, the tracking assembly may be configured to couple to a portion of the base assembly of the aircraft seat.

An aircraft seat is disclosed, in accordance with one or more embodiments of the disclosure. In one embodiment, the aircraft seat includes a base assembly couplable to a floor of an aircraft. In another embodiment, the aircraft seat includes a vertical adjustment system. In another embodiment, the aircraft seat includes a seat frame coupled to the base assembly via the vertical adjustment system. In another embodiment, the vertical adjustment system includes a swivel assembly. In another embodiment, the swivel assembly includes a swivel plate including integrally-formed connecting members, the integrally-formed connecting members configured to couple to a portion of the aircraft seat; and a swivel mechanism configured to rotate the aircraft seat about a central axis of the aircraft seat. In another embodiment, the vertical adjustment system includes a tracking assembly. In another embodiment, the tracking assembly includes a plurality of slide tubes configured to slide the aircraft seat one of side-to-side or fore-and-aft; a plurality of slide bearings configured to receive a portion of the plurality of slide tubes; and a tracking plate coupled to the plurality of slide bushings. In another embodiment, the vertical adjustment system includes an actuation assembly. In another embodiment, the actuation assembly includes an actuator configured to provide a vertical height adjustment for the aircraft seat. In another embodiment, the actuator is configured to arrest relative motion between a base assembly of the aircraft seat and an upper portion of the aircraft seat. In another embodiment, the actuation assembly includes a release mechanism configured to couple to a rotatory portion of the swivel plate and configured to release the actuator. In another embodiment, the actuation assembly includes a plurality of vertical stabilizer rods coupled to a portion of the tracking plate. In another embodiment, the actuation assembly includes a pillow block assembly. In another embodiment, the pillow block assembly including a plurality of pillow blocks coupled to a portion of the swivel plate. In another embodiment, the pillow block assembly includes a plurality of rollers coupled to a portion of the plurality of pillow blocks, the plurality of rollers configured to receive a portion of the plurality of stabilizer rods, the plurality of rollers configured to provide stability along the vertical stabilizer rods when the actuator provides the vertical height adjustment.

In some embodiments, the swivel mechanism may include a first inner ring; an additional inner ring, the swivel plate positioned between the first inner ring and the additional inner ring; one or more ball bearings, the one or more ball bearings positioned between the swivel plate and at least one of the first inner ring or the additional inner ring; and a locking ring, the locking ring include one more teeth to arrest the relative motion between the swivel plate and at least one of the first inner ring or the additional inner ring.

In some embodiments, the swivel mechanism may include a helix swivel mechanism and a locking mechanism configured to engage the helix swivel mechanism to lock the aircraft seat in a select position. The helix swivel mechanism may include a shaft. The shaft may include one or more helical protrusions.

In some embodiments, the integrally-formed connecting members may be configured to couple to a portion of seat frame of the aircraft seat.

In some embodiments, the tracking assembly may be configured to couple to a portion of the base assembly of the aircraft seat.

In some embodiments, the integrally-formed connecting members may be configured to couple to a portion of base assembly of the aircraft seat.

In some embodiments, the tracking assembly may be configured to couple to a portion of the base assembly of the aircraft seat.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5A illustrates a swivel assembly of the vertical adjustment system, in accordance with one or more embodiments of the disclosure;

FIG. 8B illustrates the helix vertical adjustment system, in accordance with one or more embodiments of the disclosure.

DETAILED DESCRIPTION OF THE INVENTION

Figure 1:
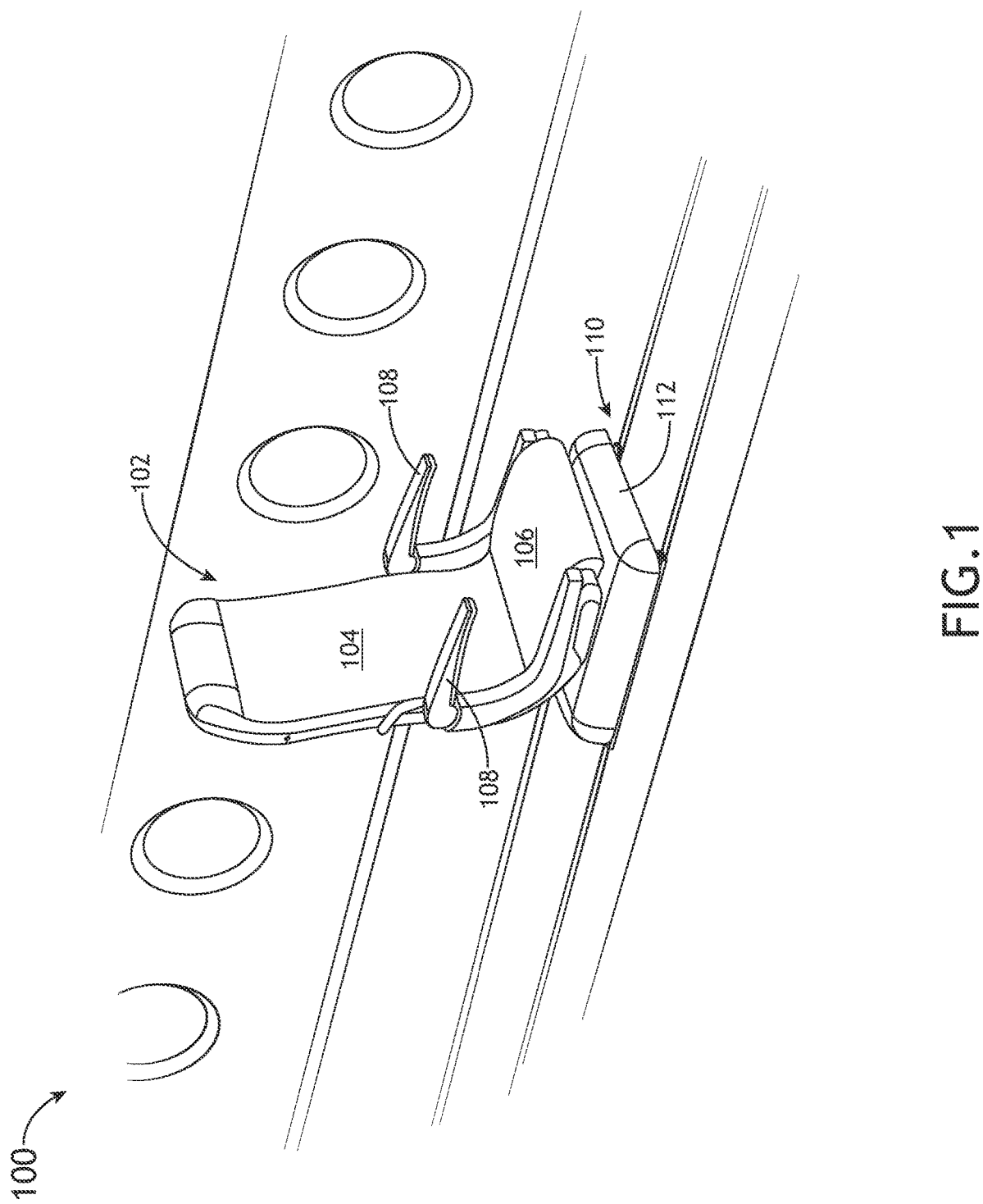
FIG. 1 illustrates an aircraft cabin with an aircraft seat including a vertical adjustment system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-7B in general illustrate a vertical adjustment system for an aircraft seat, in accordance with one or more embodiments of the disclosure.

Often it is desirable to have an aircraft seat configured with one or more comfort features for a passenger to adjust as necessary. For example, it is often desirable to have an aircraft seat with the ability to swivel the aircraft seat, slide side-to-side, and slide the aircraft seat fore and aft. Further, it is often desirable to have an aircraft seat with the ability to adjust a vertical height with the aircraft. However, the vertical height adjustment feature is lacking in conventional aircraft seats. Further, the vertical height adjustment feature is lacking in conventional aircraft seats.

Accordingly, embodiments of the present disclosure are directed to curing one or more of the shortfalls of previous approaches identified above. Broadly, embodiments of the present disclosure are directed to a vertical adjustment system for an aircraft seat to adjust a vertical height of the aircraft seat. More particularly, embodiments of the present disclosure are directed to a vertical adjustment system for an aircraft seat including a swivel mechanism and a tracking mechanism. In this regard, the vertical adjustment system may be configured to allow for motion of the aircraft seat up and down, side-to-side, fore and aft, and to rotate (swivel).

It is noted herein that the vertical adjustment system may be implemented in any environment or number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Where the environment may be an aviation environment, the aircraft cabin designs need to be certified in accordance with aviation guidelines and standards, while being designed so as not to lose the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

FIG. 1 illustrates an aircraft cabin 100 including an aircraft seat 102, in accordance with one or more embodiments of the disclosure.

The aircraft seat 102 may include a seat back 104. The aircraft seat 102 may include a seat pan 106. The aircraft seat 102 may include one or more arms 108. The aircraft seat 102 may be coupled to a base 110. The base 110 may be covered by a shroud 112. For example, the shroud 112 may include one or more sections configured to cover at least a portion of the aircraft seat 102. For instance, the shroud 112 may include a bucket shroud section and a base shroud section. It is noted herein, however, that the shroud 112 may be formed from one piece (e.g., includes a single section).

Figure 2A:
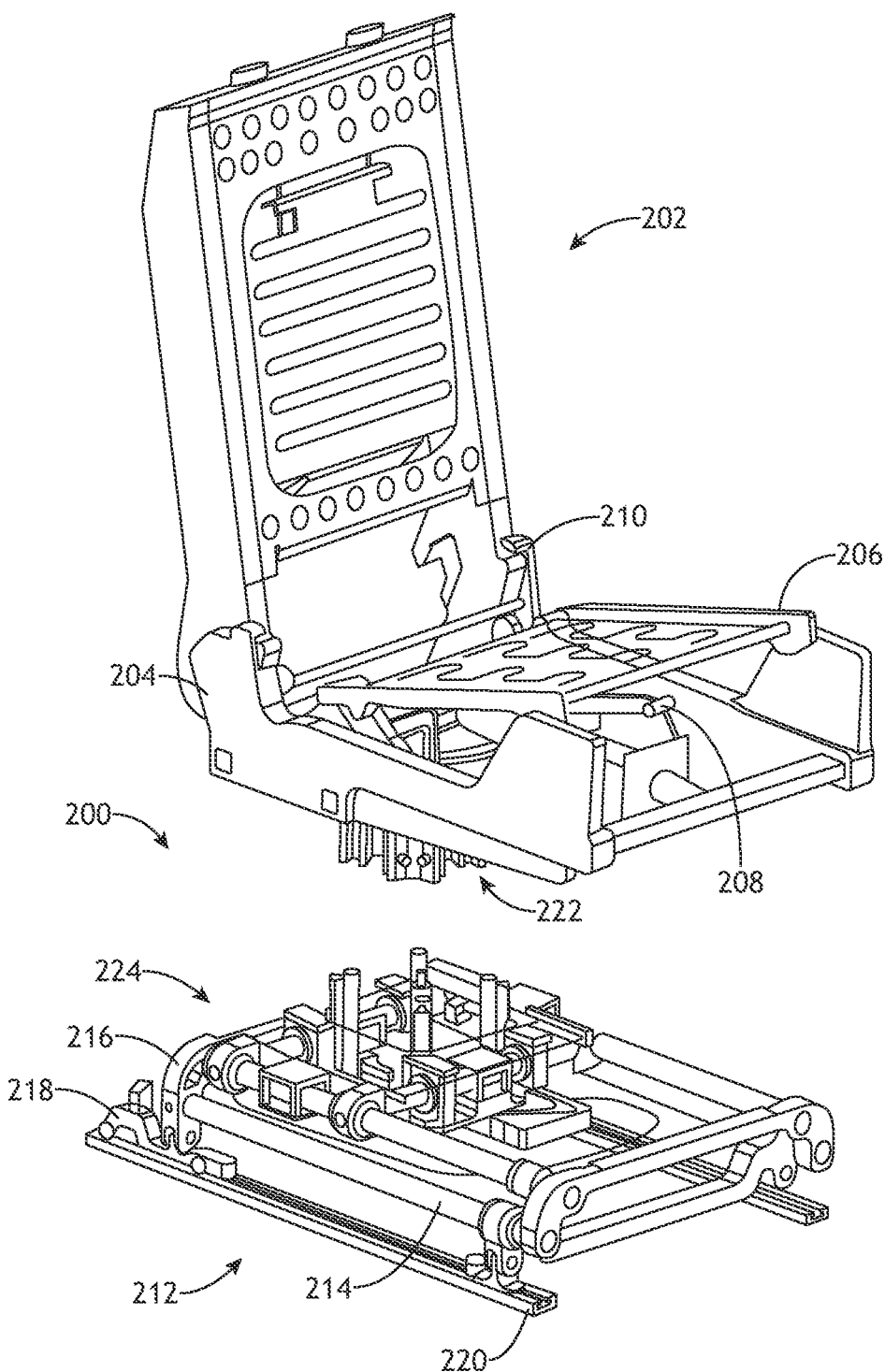
FIG. 2A illustrates a seat frame and a base assembly of the aircraft seat including the vertical adjustment system in an upright configuration, in accordance with one or more embodiments of the disclosure.
Figure 2B:
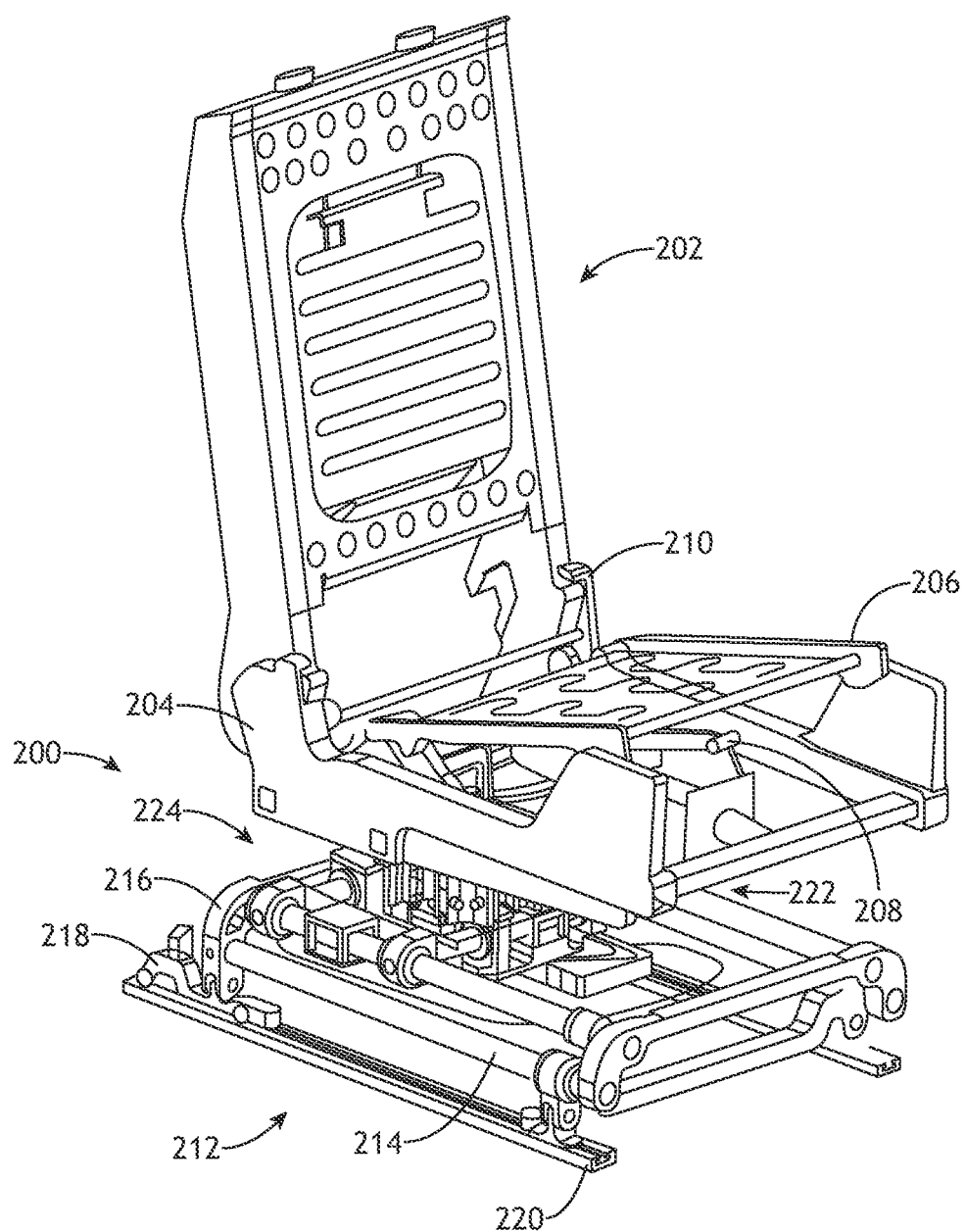
FIG. 2B illustrates the seat frame and the base assembly of the aircraft seat including the vertical adjustment system in an upright configuration, in accordance with one or more embodiments of the disclosure.
Figure 3A:
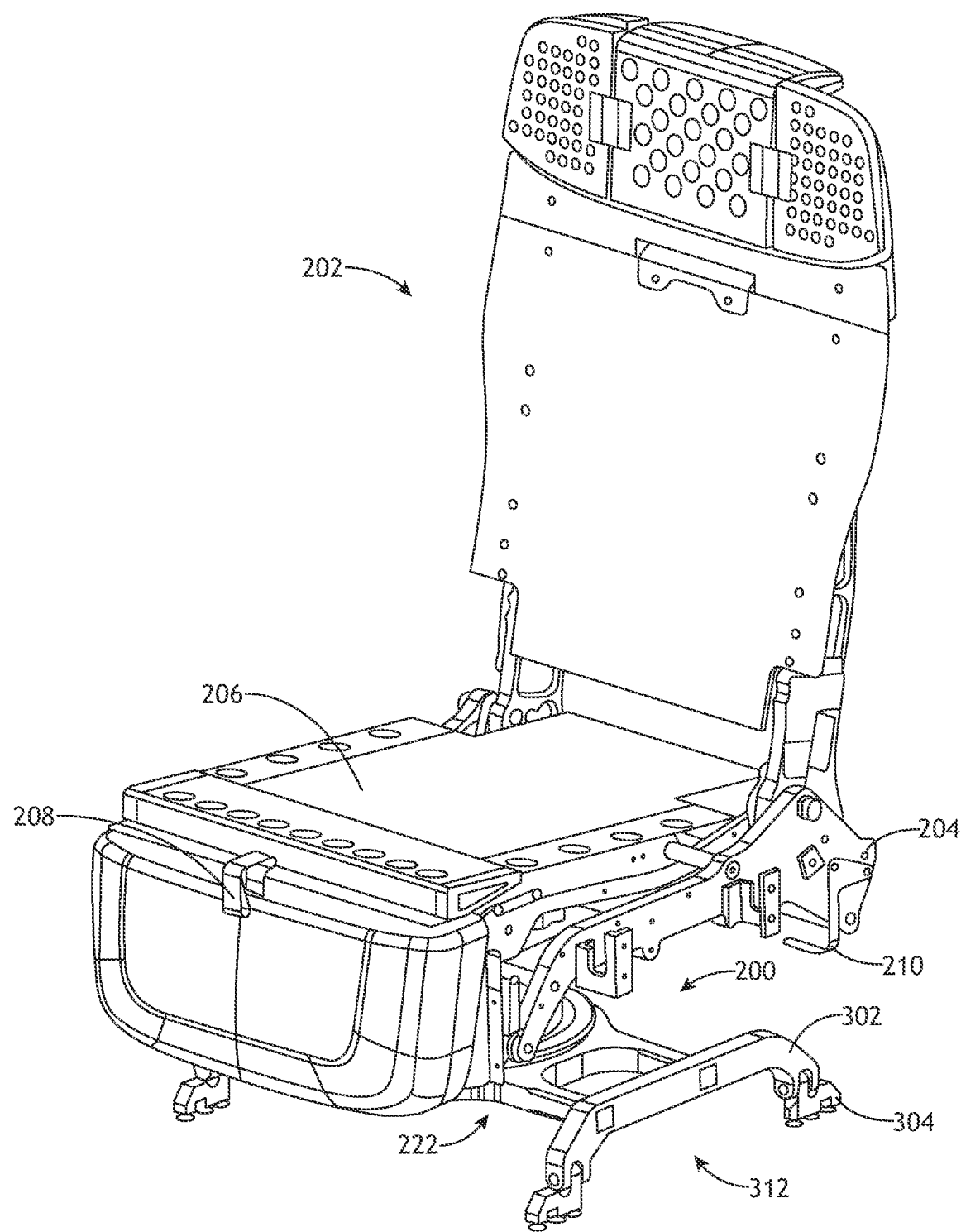
FIG. 3A illustrates a seat frame and a base assembly of the aircraft seat including the vertical adjustment system in an upside down configuration, in accordance with one or more embodiments of the disclosure.
Figure 3B:
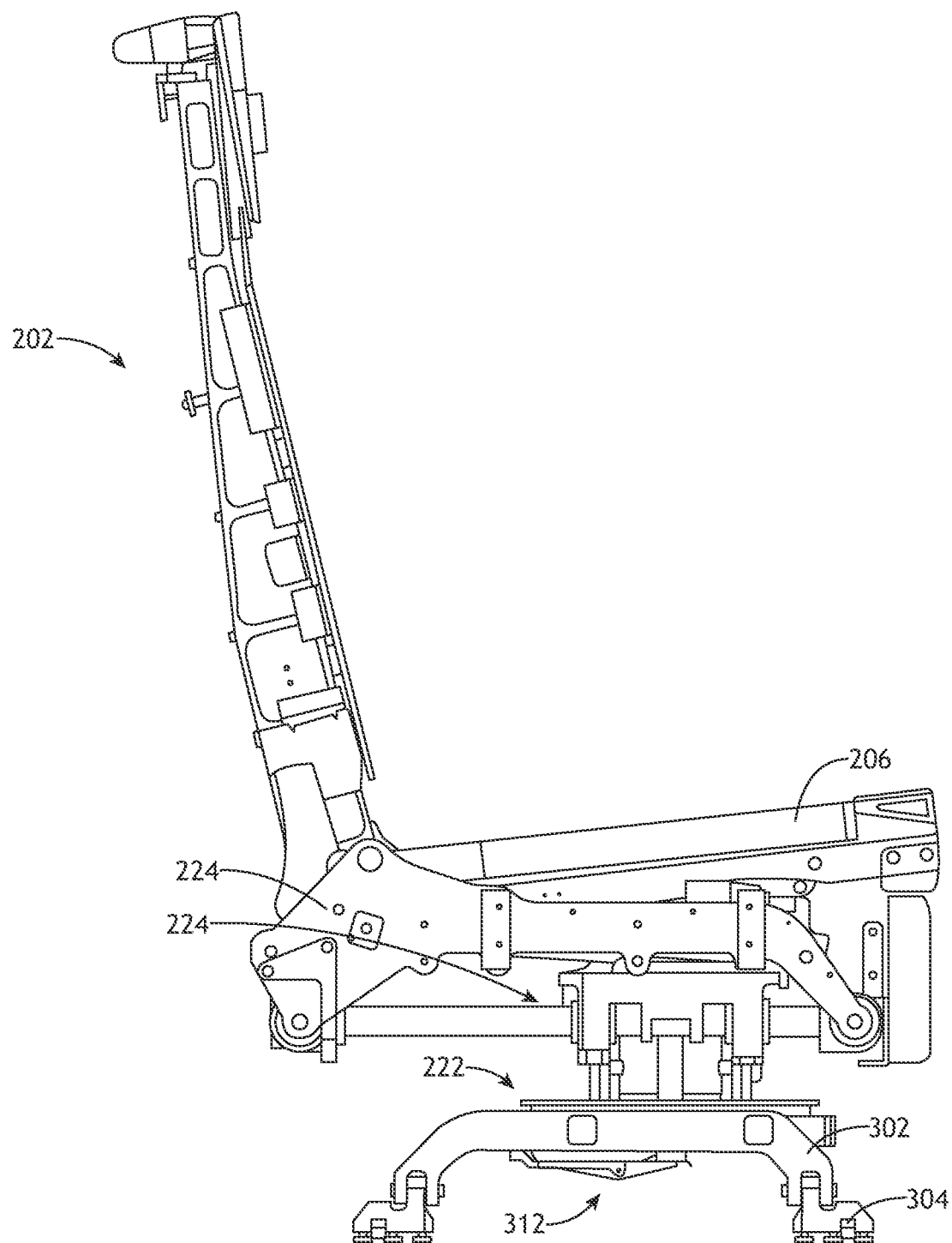
FIG. 3B illustrates the seat frame and the base assembly of the aircraft seat including the vertical adjustment system an upside down configuration, in accordance with one or more embodiments of the disclosure.
Figure 3C:
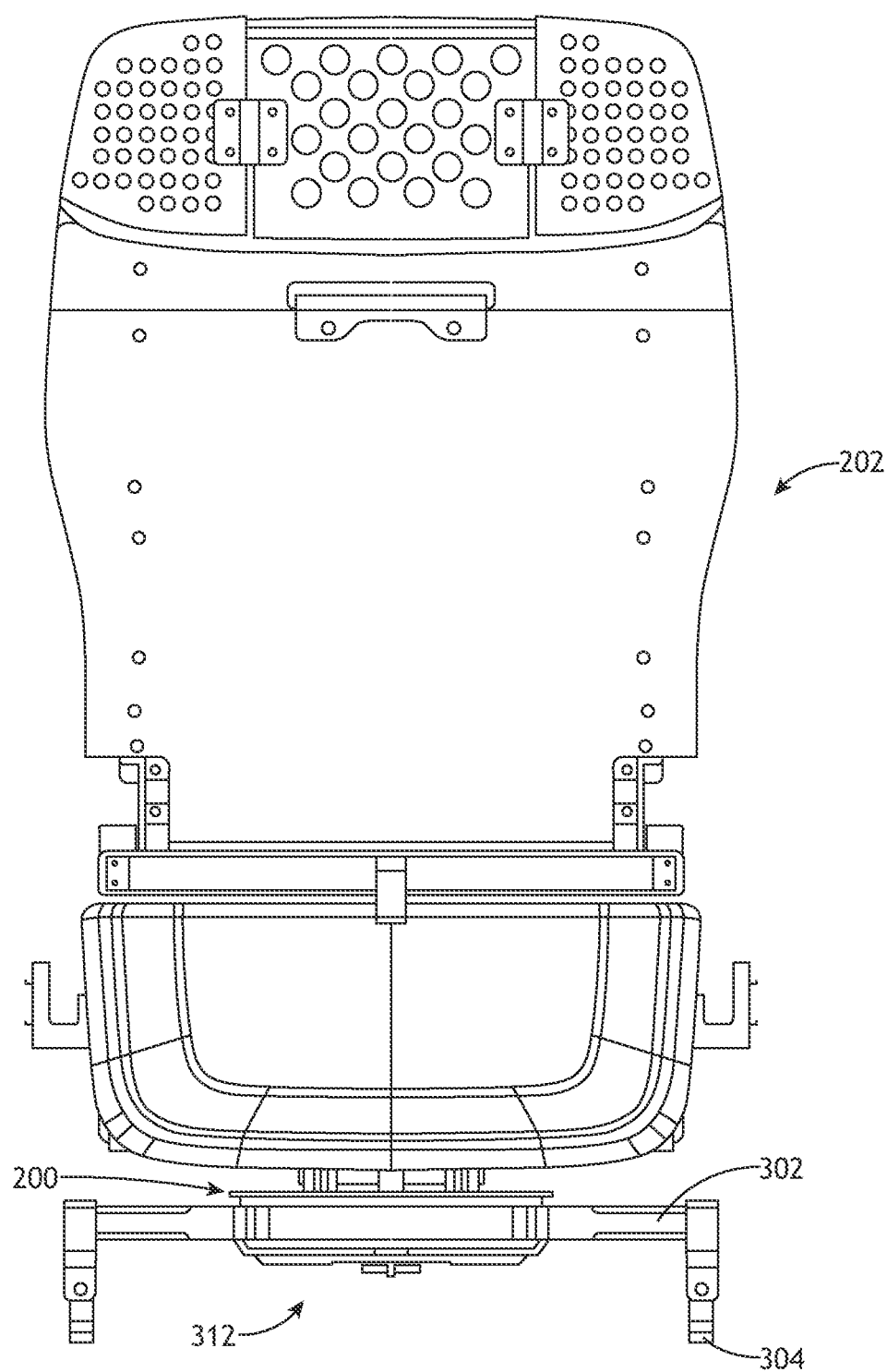
FIG. 3C illustrates the seat frame and the base assembly of the aircraft seat including the vertical adjustment system an upside down configuration, in accordance with one or more embodiments of the disclosure.

The aircraft seat 102 may include a vertical adjustment system 200. It is noted that the vertical adjustment system 200 may be adapted and mounted in any orientation to cater to various aircraft seat base designs and requirements. For example, as shown in FIGS. 2A-2B, the vertical adjustment system 200 may be mounted in an upright orientation of the aircraft seat 102. By way of another example, as shown in FIGS. 3A-3C, the vertical adjustment system 200 may be mounted in an upside down orientation of the aircraft seat 102.

The aircraft seat 102 may include a seat back frame 202. The aircraft seat 102 may include a seat frame 204. The aircraft seat 102 may include a seat pan frame 206. The seat frame 204 may include one or more components 208 and/or one or more components 210. For example, the one or more components 208, 210 may be configured to allow and/or assist the aircraft seat 102 to recline and/or return to an upright position.

One or more of the seat back frame 202 and/or the seat pan frame 206 may be directly coupled, or indirectly coupled via one or more interconnecting components, to the one or more of the components 208, 210 of the seat frame 204. At least a portion of the shroud 112 (e.g., the bucket shroud section of the shroud 112) may be configured to cover the seat frame 204 and/or the seat pan 206.

Referring to FIGS. 2A-2B, the aircraft seat 102 (e.g., the base 110, as illustrated in FIG. 1) may include a base assembly 212. The base assembly 212 may include one or more base rails 214 (e.g., tubes, bars, or the like). For example, the one or more base rails 214 may be positioned relative to a particular direction of travel of the aircraft seat 102 including, but not limited to, perpendicular (e.g., crosswise), parallel (e.g., cross-wise), or the like. For instance, the one or more base rails 214 may be positioned relative to a same or a different direction of travel of the aircraft seat 102.

The base assembly 212 may include one or more base brackets 216. For example, the one or more base rails 214 may be coupled together via the one or more base brackets 216. For example, a base bracket 216 may couple together an adjacent base rail 214 and base rail 214 at any angle, such that the base assembly 212 may include an outline of any geometric shape known in the art. For instance, the outline may be rectangular or substantially rectangular. Therefore, the above description should not be interpreted as a limitation on the present disclosure but merely an illustration.

The one or more base brackets 216 may be coupled to a set of floor tracks 218 of the aircraft cabin 100 (e.g., as illustrated in FIG. 1) via one or more floor fittings 220. At least a portion of the shroud 112 (e.g., the base shroud section of the shroud 112) may be configured to cover the base assembly 212.

Referring to FIGS. 3A-3C, the aircraft seat 102 (e.g., the base 110, as illustrated in FIG. 1) may include a base assembly 312. The base assembly 312 may include one or more fixed base rails 302. The one or more fixed base rails 302 may be coupled to a set of floor tracks of the aircraft cabin 100 (e.g., as illustrated in FIG. 1) via one or more floor fittings 304. At least a portion of the shroud 112 (e.g., the base shroud section of the shroud 112) may be configured to cover the base assembly.

Referring generally to FIGS. 2A-3B, the seat 102 and the base 110 (e.g., as illustrated in FIG. 1) may be coupled together via the vertical adjustment system 200. For example, the seat frame 204 of the seat 102 (e.g., as illustrated in FIG. 1) and the base assembly 212, 312 of the base 110 (e.g., as illustrated in FIG. 1) may be coupled together via the vertical adjustment system 200. For example, as shown in FIGS. 2A-2B, the vertical adjustment system 200 may include a swivel assembly 222 attached to the aircraft seat 102 and a tracking assembly 224 attached to the base 110, wherein the swivel assembly and tracking assembly may be attached via an actuation assembly. By way of another example, as shown in FIGS. 3A-3C, the vertical adjustment system 200 may include a swivel assembly 222 attached to the base and a tracking assembly 224 attached to the aircraft seat 102, wherein the swivel assembly and tracking assembly may be attached via an actuation assembly.

The vertical adjustment system 200 may include a swivel assembly 222 configured to rotate (e.g., swivel) the aircraft seat 102 relative to the tracking assembly about an axis through the vertical adjustment system.

Figure 5B:
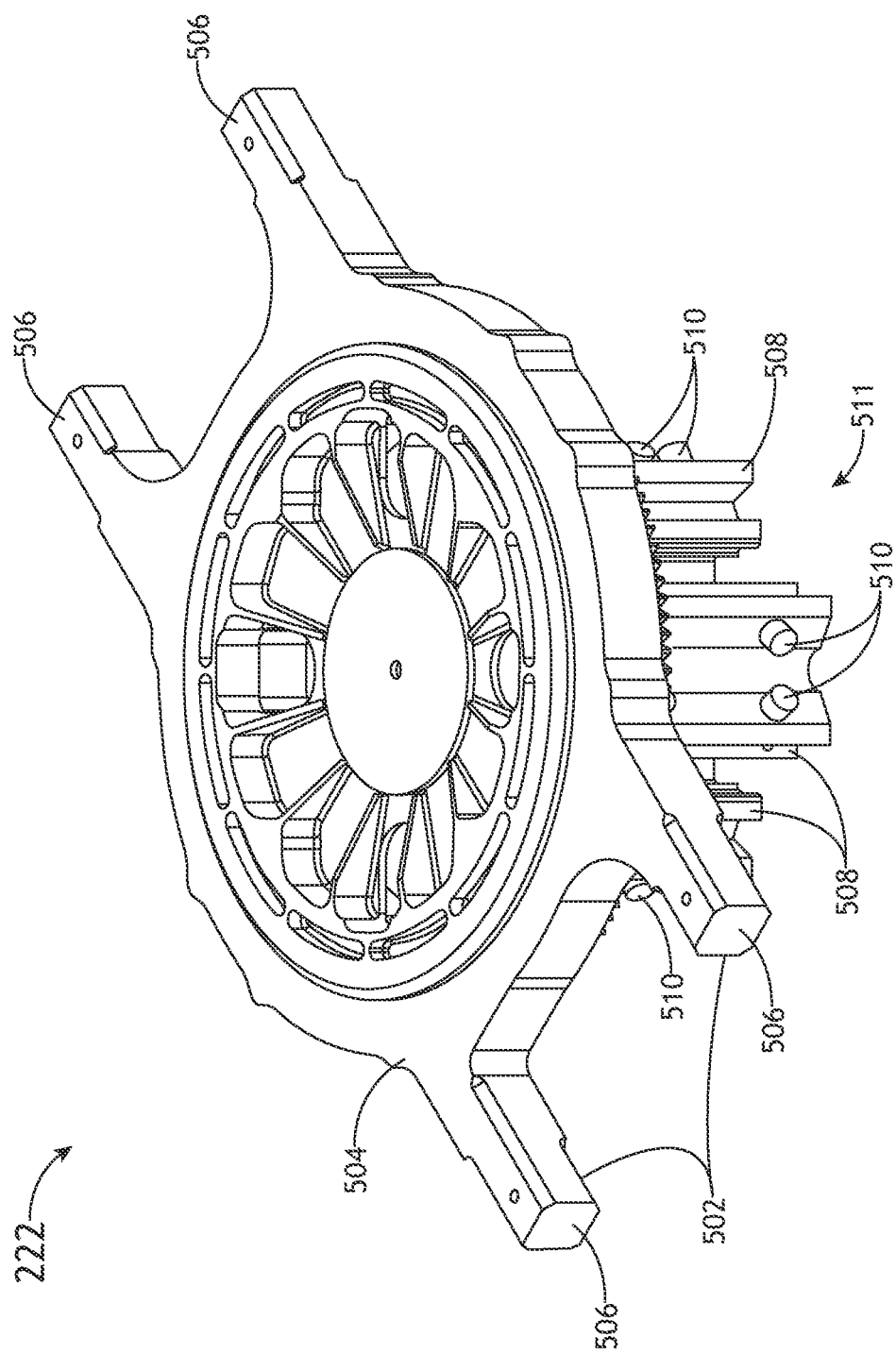
FIG. 5B illustrates the swivel assembly of the vertical adjustment system, in accordance with one or more embodiments of the disclosure.

Referring to FIGS. 5A-5B, the swivel assembly 222 may include a swivel mechanism 500 and a traversely-extending spar 502. The swivel mechanism is preferably integrally-formed with and forms the spar (e.g., a "sparvel" mechanism).

The swivel mechanism includes a swivel plate 504 (e.g., an outer ring). The swivel plate includes integrally-formed connecting members 506. The integrally-formed connecting members may be configured to mount to a portion of the aircraft seat 102. For example, as shown in FIGS. 2A-2B, the integrally-formed connecting members 506 may be configured to mount to the seat frame 204 of the aircraft seat 102. For instance, the integrally-formed connecting members 506 may include one or more bolt holes positioned to align with one or more bolts holes of the seat frame. In this regard, the swivel assembly thus becomes the spar, mounting the seat frame and the attached seat back to the base rails without adding height to the seat. By way of another example, as shown in FIGS. 3A-3C, the integrally-formed connecting members may be configured to mount to the one or more fixed base rails 302 of the base assembly 312. For instance, the integrally-formed connecting members may include one or more bolt holes positioned to align with one or more bolt holes of the one or more fixed base rails 302. In this regard, the swivel assembly thus becomes the spar, mounting the base rails to the seat frame and the attached seat back without adding height to the seat.

Referring to FIG. 5A, the swivel mechanism may include one or more inner rings. For example, the swivel mechanism may include a first inner ring 512. By way of another example, the swivel mechanism may include an additional inner ring 516. The outer ring 504 (swivel plate 504) may be positioned between the first inner ring 512 and the additional inner ring 516. When the outer ring 504 is fixed to the seat 102, the one or more inner rings 512, 516 may be configured to rotate. When the one or more inner rings 512, 516 are held steady, the outer ring 504 may be configured to rotate.

The swivel mechanism may include one or more ball bearings 514. For example, the swivel mechanism may include a first ball bearing 514 positioned between the outer 504 (swivel plate 504) and the first inner ring 512. By way of another example, the swivel mechanism may include an additional ball bearing 514 positioned between the outer 504 (swivel plate 504) and the additional inner ring 516.

The swivel mechanism may include a toothed ring 518 configured to arrest the relative motion between the inner rings and the outer ring as required in the upright or upside down configuration.

The swivel mechanism may include one or more fasteners 520 configured to couple the one or more swivel mechanism components to each other. For example, the first inner ring 512 may include one or more fastener holes configured to receive a portion of the one or more fasteners 520.

The vertical adjustment system may include a tracking assembly 224 configured to allow the aircraft seat 102 to move side-to-side and fore-and-aft within a select range of motion.

Referring to FIG. 5B, the swivel assembly 222 may include a plurality of pillow block assemblies 511. For example, the swivel plate may be configured to couple to four or more pillow block assemblies 511. For instance, each pillow block assembly 511 may be configured to couple to the outer ring 504.

Each pillow block assembly 511 may include a pillow block 508 and a plurality of rollers 510. For example, each pillow block assembly 511 may include a pillow block 508 and four or more rollers 510. The plurality of rollers 510 may be configured to provide stable vertical movement along the vertical stabilizer rods 606 of the tracking assembly 224.

Figure 6A:
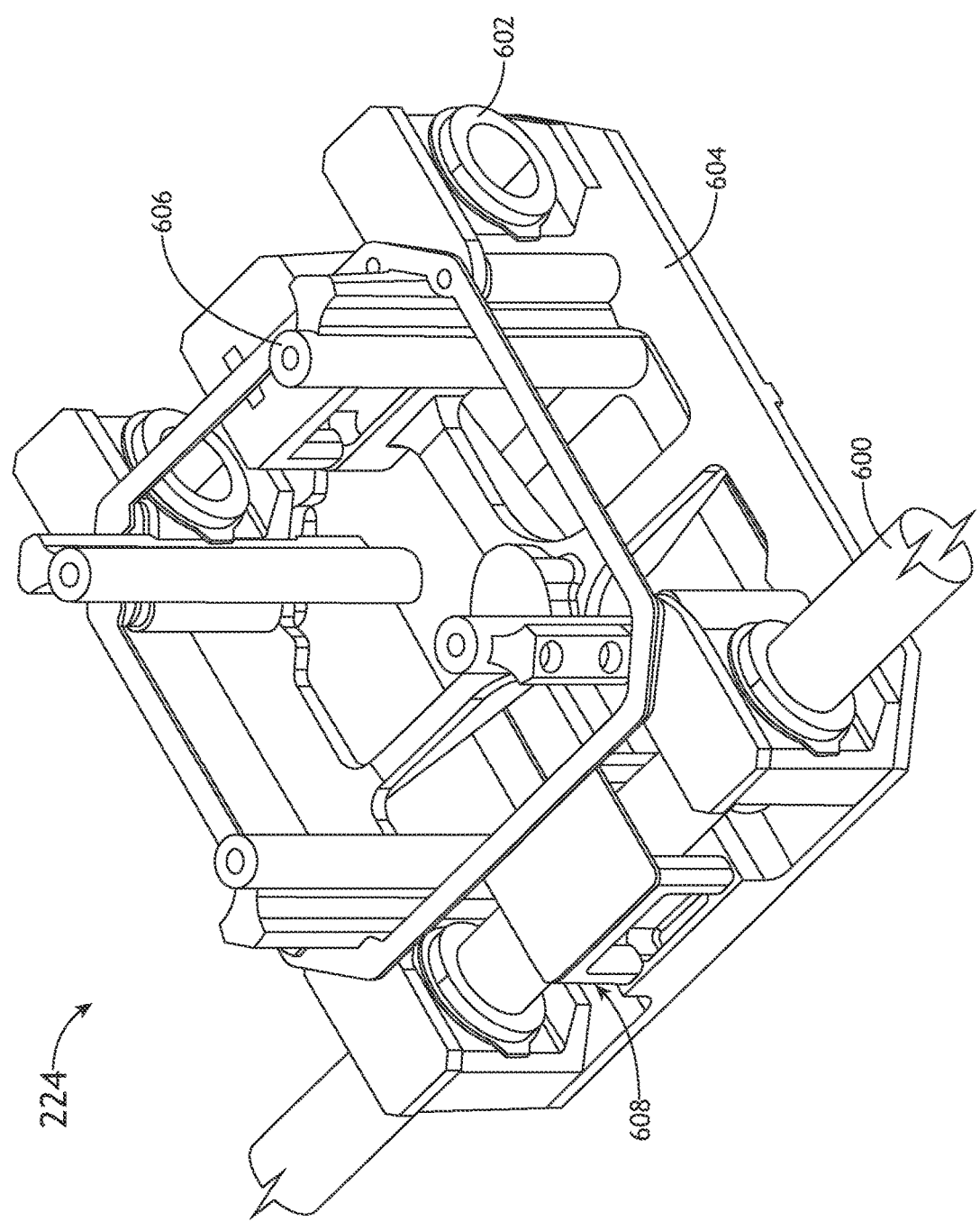
FIG. 6A illustrates a tracking assembly and one or more stabilizer rods of the vertical adjustment system, in accordance with one or more embodiments of the disclosure.
Figure 6B:
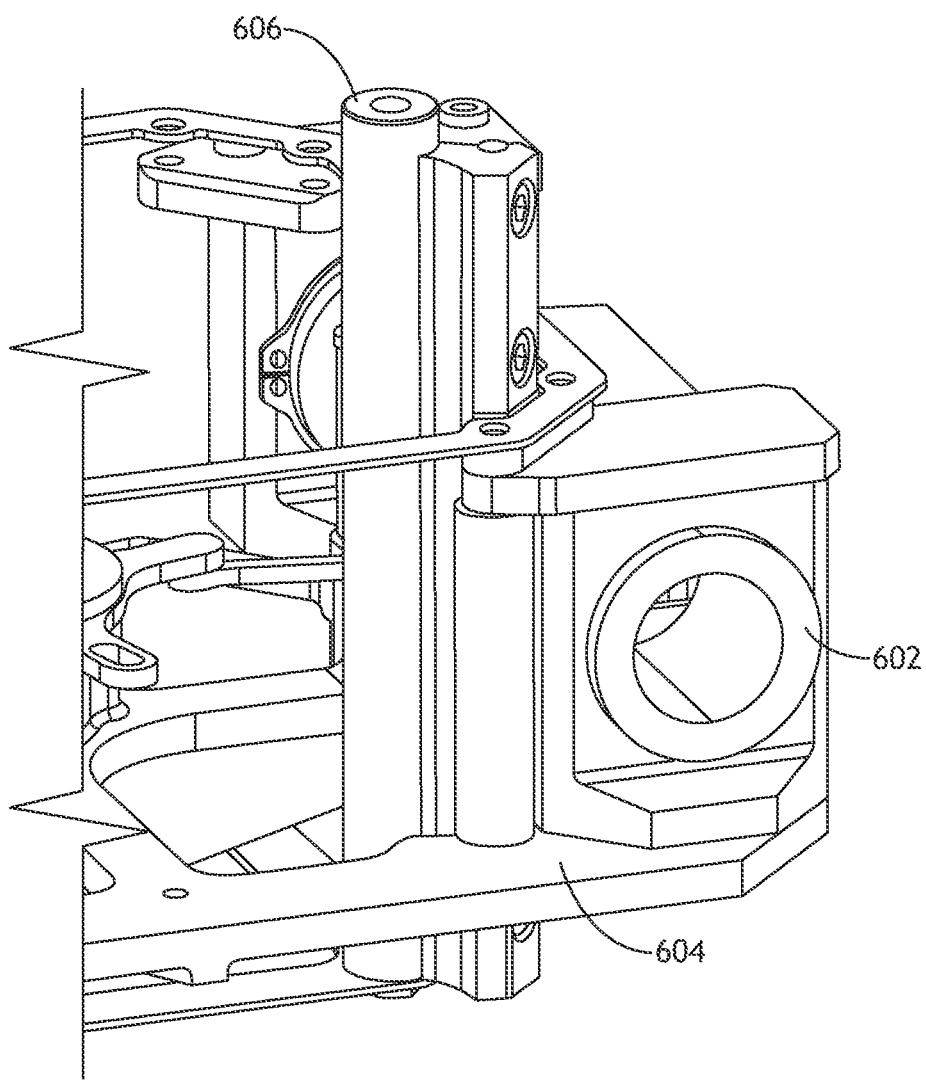
FIG. 6B illustrates a localized view of the tracking bearing and one or more stabilizer rods of the vertical adjustment system, in accordance with one or more embodiments of the disclosure.

Referring to FIGS. 6A-6B, the tracking assembly 224 may include a plurality of slide tubes 600. For example, the tracking assembly 224 may include one or more slide tubes 600 for side-to-side translating movement. By way of another example, the tracking assembly 224 may include one or more slide tubes 600 for fore-and-aft translating movement. In this regard, the seat frame and the attached seat back may be permitted to slide side-to-side and fore-and-aft within the range of motion providing by the length of the slide tubes. The plurality of slide tubes 600 may be locked via a tube locking mechanism 608. For example, the locking mechanism 608 may be configured to engage the plurality of slide tubes 600 to cause the plurality of slide tubes 600 to lock in a select position. This permits a seated passenger a wide range of seat adjustment during travel, as well as the ability to slide the aircraft seat 102 away from the fuselage and aft while swiveling via the swiveling assembly to comfortably stand up and leave the aircraft seat.

The tracking assembly may include a plurality of slide bearings 602 configured to receive a portion of the plurality of slide tubes 600. For example, the tracking assembly 224 may include one or more slide bearings 602 for side-to-side translating movement. For instance, the one or more slide bearings 602 for side-to-side translating may be configured to receive one or more slide tubes 600 for side-to-side translating. In this regard, the slide tube may slide/translate a select distance based on the length of the slide tube. By way of another example, the tracking assembly 224 may include one or more slide bearings 602 for fore-and-aft translating movement. For instance, the one or more slide bearings 602 for fore-and-aft translating movement may be configured to receive one or more slide tubes 600 for fore-and-aft translating movement. In this regard, the slide tube may slide/translate a select distance based on the length of the slide tube.

The tracking assembly 224 may include a tracking plate 604. The tracking plate 604 may include a plurality stabilizer rods 606. The plurality stabilizer rods 606 may be configured to couple to the swivel assembly 222 via the pillow block assemblies 511. For example, the swivel assembly 222 including the pillow block assemblies 511 may be configured to couple to the tracking assembly 224 via the four or more vertical stabilizer rods 606. In this regard, the pillow block assemblies 511 may be configured to provide stable vertical movement via the plurality of vertical stabilizer rods 606 and the plurality of rollers 510.

Figure 4A:
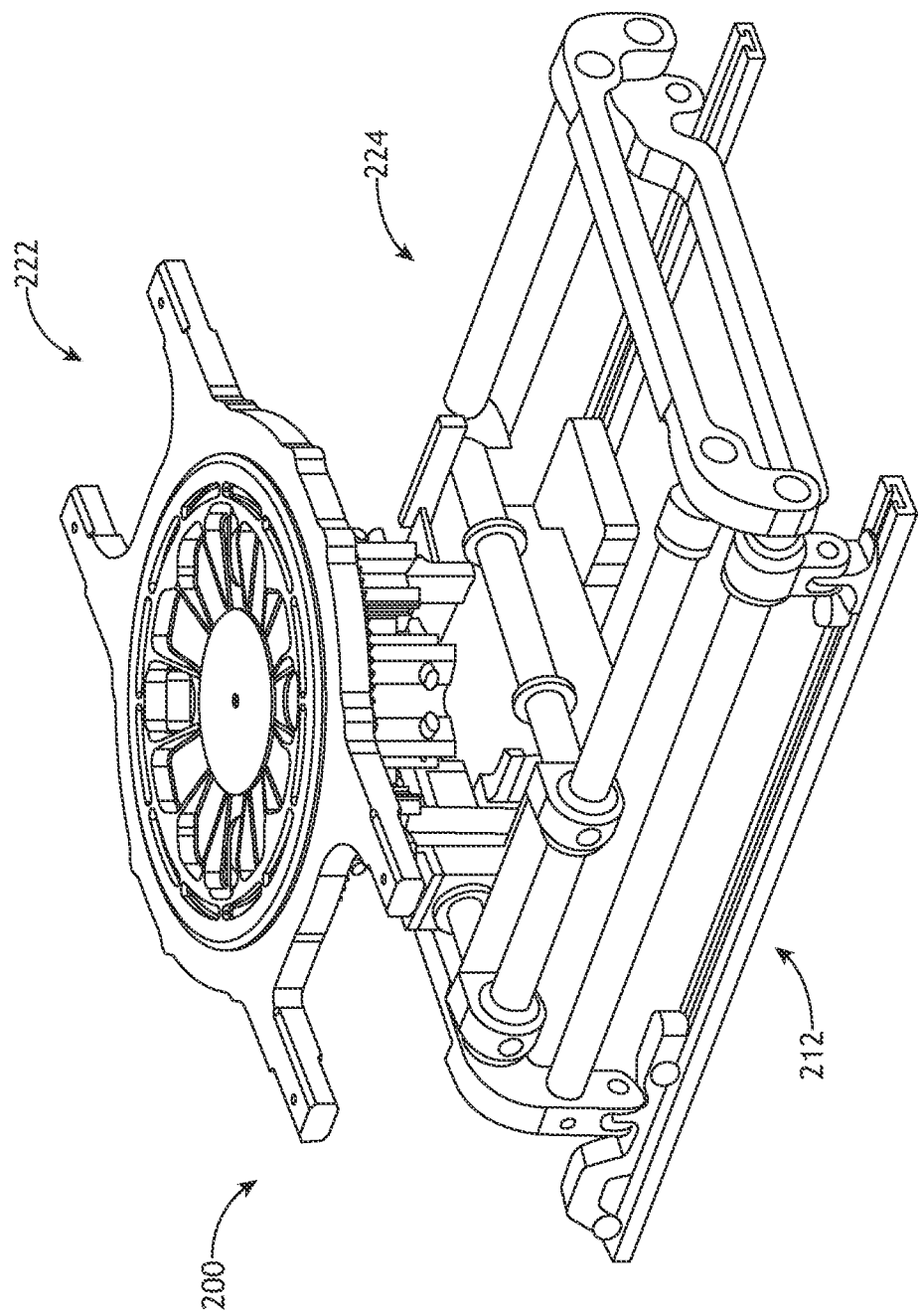
FIG. 4A illustrates the vertical adjustment system in an upright configuration, in accordance with one or more embodiments of the disclosure.
Figure 4B:
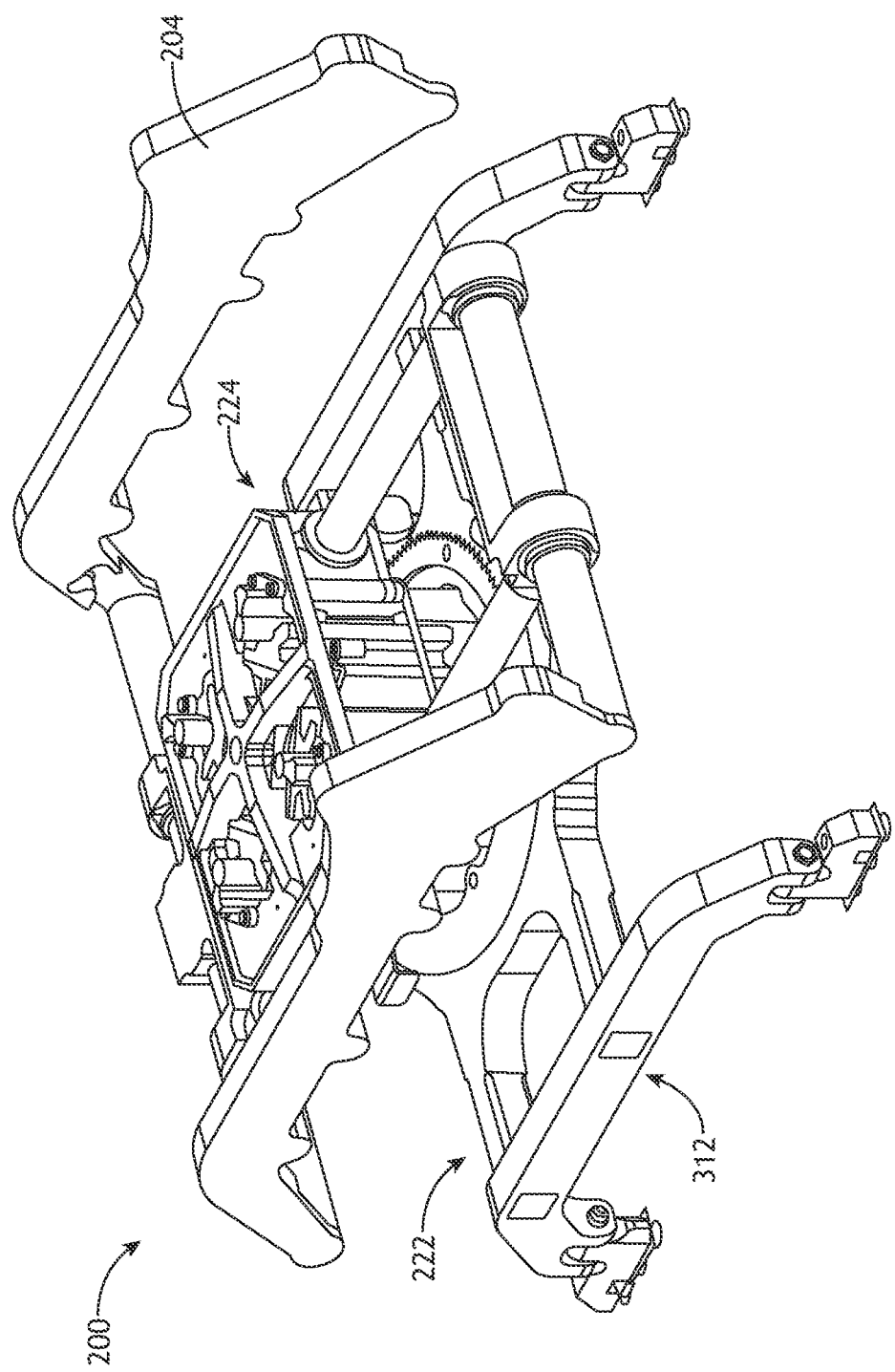
FIG. 4B illustrates the vertical adjustment system in an upside down configuration, in accordance with one or more embodiments of the disclosure.

Referring to FIGS. 4A-4B, the tracking assembly 224 may couple to the swivel assembly 222 via the one or more stabilizer rods 606 and plurality of vertical rollers 510 It is noted that the tracking assembly 224 and the swivel assembly 222 may be adapted and mounted in any orientation to cater to various aircraft seat base designs and requirements. For example, as shown in FIG. 4A, the tracking assembly 224 and the swivel assembly 222 may be mounted in an upright orientation of the aircraft seat 102. For instance, the swivel assembly 222 may be mounted to the seat frame and the tracking assembly 224 may be mounted to the base assembly. By way of another example, as shown in FIG. 4B, the tracking assembly 224 and the swivel assembly 222 may be mounted in an upside down orientation of the aircraft seat 102. For instance, the swivel assembly 222 may be mounted to the base assembly and the tracking assembly 224 may be mounted to the seat frame.

Figure 7A:
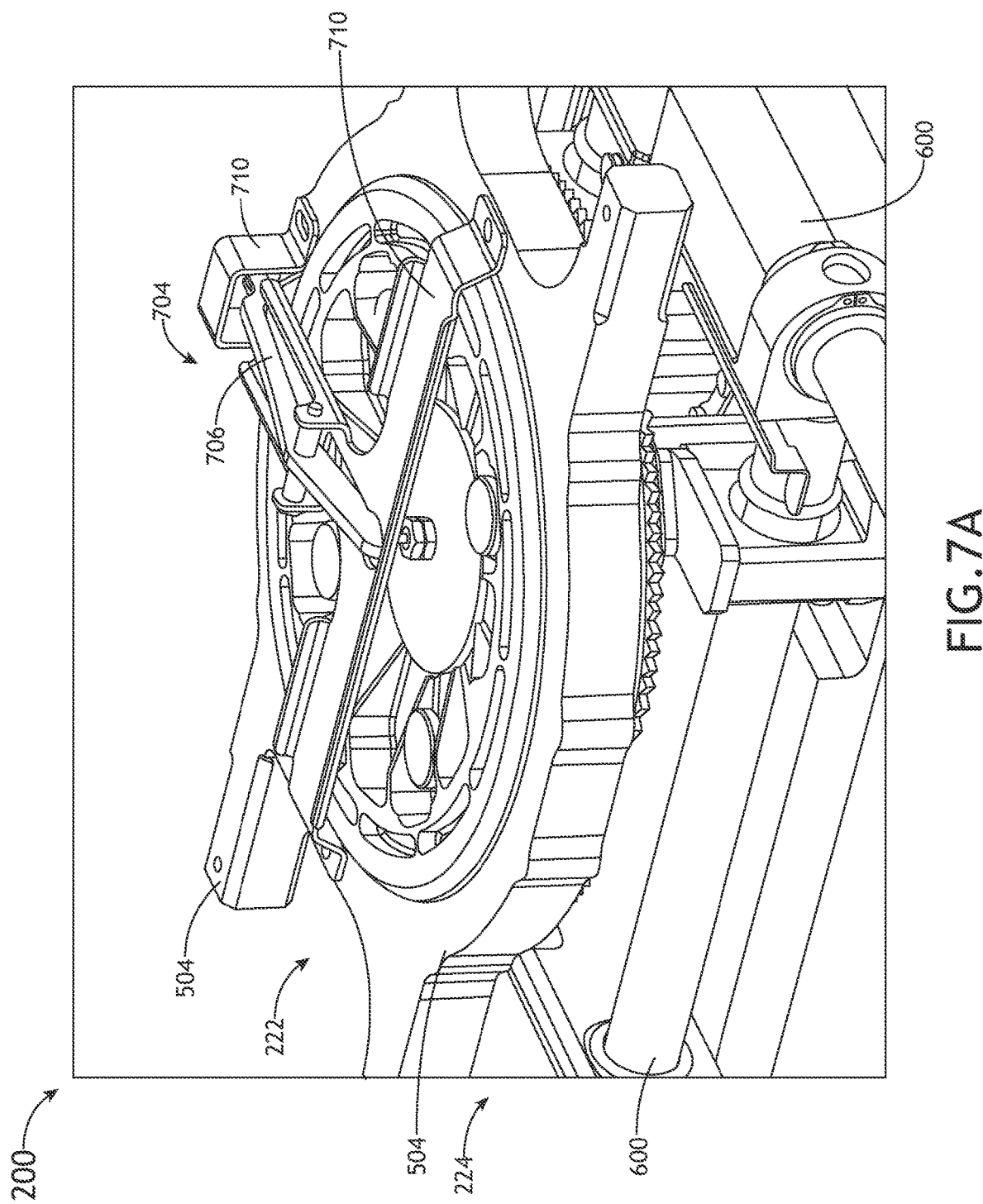
FIG. 7A illustrates a partial view of the vertical adjustment system, in accordance with one or more embodiments of the disclosure.
Figure 7B:
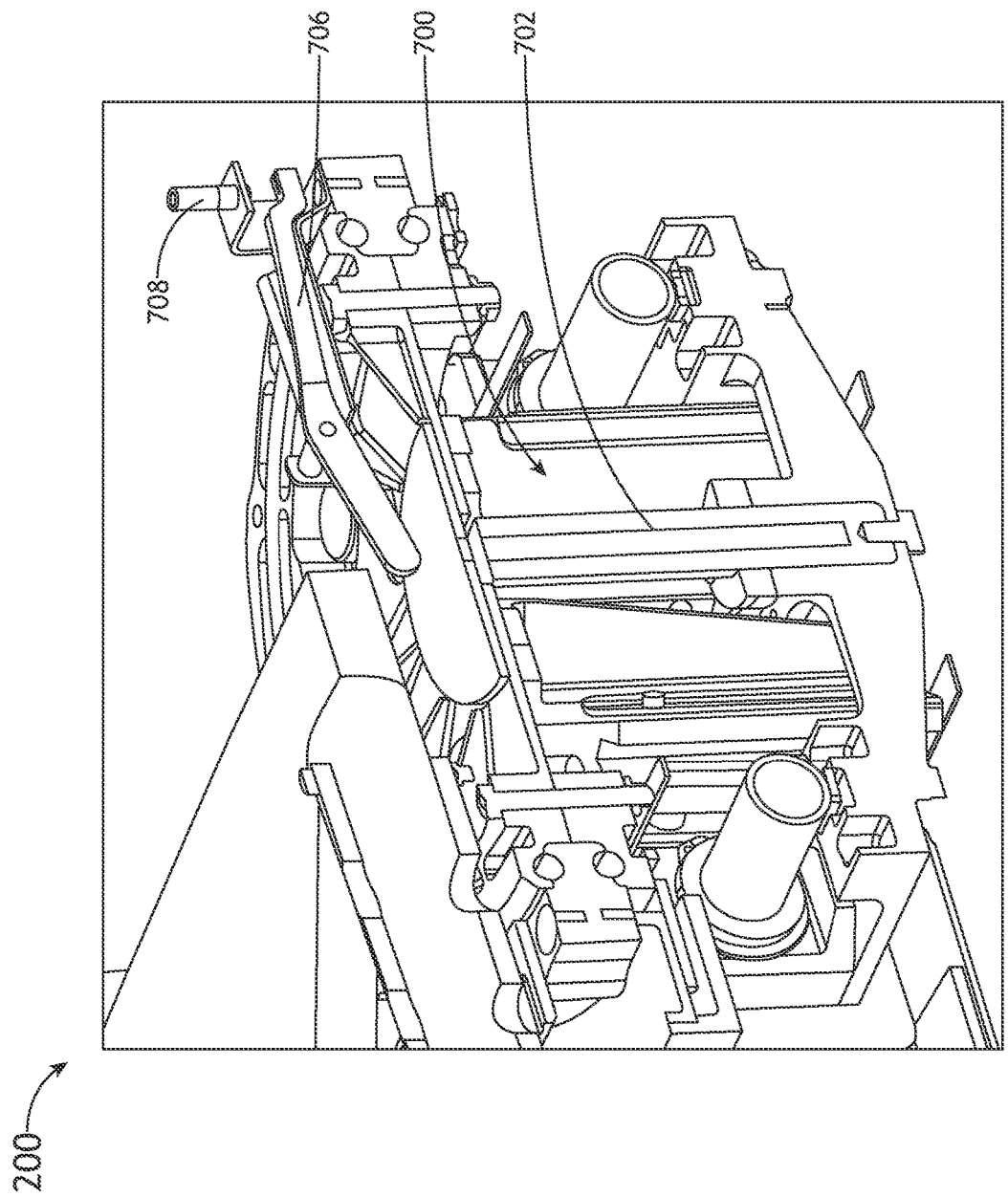
FIG. 7B illustrates a cross-sectional view of the vertical adjustment system, in accordance with one or more embodiments of the disclosure.

Referring to FIGS. 7A-7B, the vertical adjustment system 200 may include an actuation assembly 700 configured to adjust a vertical height of the aircraft seat 102. For example, the actuation assembly 700 may be configured to provide at least approximately 3 inches of vertical adjustment, with infinite positions between the lowest and highest positions. In this regard, the actuation assembly 700 may be configured to allow the aircraft seat 102 to raise vertically between 0-3 inches, with infinite positions between 0-3 inches.

The actuation assembly 700 may include an actuator 702 configured to adjust a vertical height of the aircraft seat 102. The actuation assembly 700 may include any type of actuator including, but not limited to, a gas spring actuator, hydraulic actuator, coil spring-damper actuation system, a rotary actuator, or the like.

The actuation assembly 700 may include a release mechanism 704 configured to couple to a rotary portion of the sparvel. In this regard, the release mechanism 704 will rotate along with the seat's swivel, thus there is no need to have slack.

The release mechanism 704 may include a pull lever 706 and a conduit 708 to release the actuator 702. For example, the conduit 708 may be pulled up to pivot the pull lever 706 down to release the actuator 702.

The release mechanism 704 may include one or more brackets 710 configured to hold one or more components of the release mechanism. For example, the release mechanism may include a bracket 710 configured to hold the pull lever 706. For instance, the bracket 710 may couple to one or more portions of the swivel mechanism to secure the pull lever 706. By way of another example, the release mechanism 704 may include a bracket 710 configured to hold the cable conduit 708. For instance, the bracket 710 may couple to one or more portions of the swivel mechanism to secure the cable conduit 708.

The aircraft seat 102 may be adjusted electrically. For example, the aircraft seat 102 may include a control panel for adjusting the aircraft seat 102. The control panel may be coupled to an aircraft controller. For example, the conduit 708 may directly run into the a control panel coupled to the arms 108 of the aircraft seat 102. In this regard, a passenger may electrically adjust one of swivel, tracking, or vertical height via the control panel.

Figure 8A:
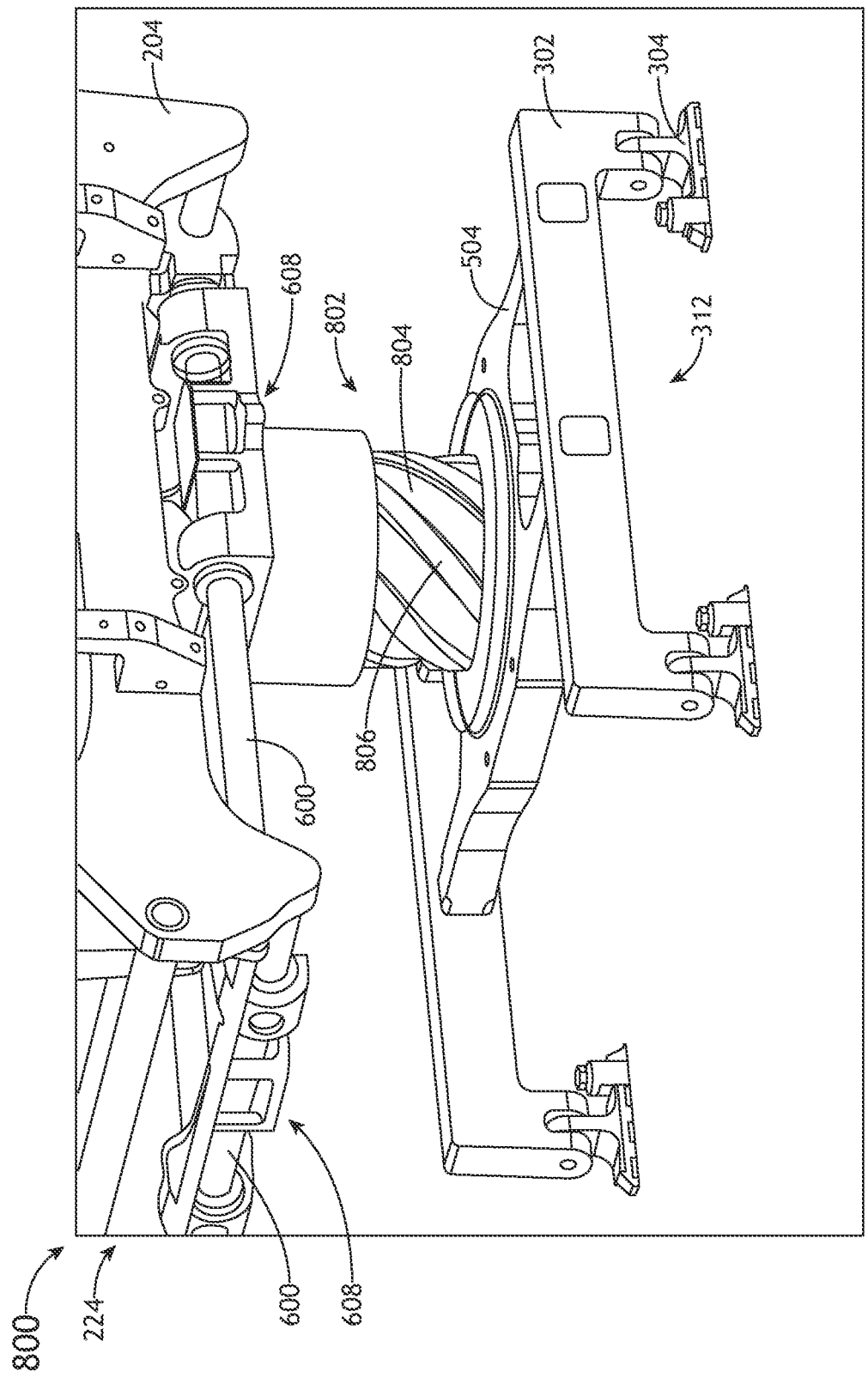
FIG. 8A illustrates a helix vertical adjustment system, in accordance with one or more embodiments of the disclosure.

FIGS. 8A-8B in general illustrate a helix vertical adjustment system 800 for an aircraft seat 102, in accordance with one or more embodiments of the disclosure. It is noted that the description of the various embodiments, components, and operations described previously herein with respect to the aircraft seat 102 should be interpreted to extend to the system 800, and vice versa. Further, is noted that the description of the various embodiments, components, and operations described previously herein with respect to the system 200 should be interpreted to extend to the system 800, and vice versa, unless otherwise noted herein.

The aircraft seat 102 may include a helix vertical adjustment system 800. It is noted that the vertical adjustment system 200 may be adapted and mounted in any orientation to cater to various aircraft seat base designs and requirements. For example, the helix vertical adjustment system 800 may be mounted in an upright orientation of the aircraft seat 102. For instance, a portion of the helix adjustment system 800 may be hard mounted to a portion of the tracking plate. By way of another example, the helix vertical adjustment system 800 may be mounted in an upside down orientation of the aircraft seat 102.

The helix vertical adjustment system 800 may include a swivel plate 504 including integral-connecting members 506 and a traversely-extending spar (e.g., a sparvel) and the tracking assembly 224.

The helix vertical adjustment system 800 may include a helix swivel mechanism 802 configured to allow the aircraft seat 102 to rotate (e.g., swivel) about a central axis. For example, the helix swivel mechanism 802 may include a shaft 804 including one or more helical protrusions 806 (e.g., protrusions in a helical configuration). The shaft 804 may be mounted to a portion of the swivel plate 504. It is noted that the helix swivel mechanism 802 may be configured to provide rigidity for the adjustment system 800.

The helix vertical adjustment system 800 may include an actuator 808 configured to adjust a vertical height of the aircraft seat 102. The adjustment system 800 may include any type of actuator including, but not limited to, a gas spring actuator, hydraulic actuator, coil spring-damper actuation system, a rotary actuator, or the like. For example, as shown in FIGS. 8A-8B, the actuator 808 may include a gas spring configured to be mounted within the shaft 804 of the helix mechanism 802 to adjust a vertical height of the aircraft seat 102. In this regard, the shaft 804 may include an internal cavity to house the actuator 808.

The helix vertical adjustment system 800 may include a locking mechanism 810 configured to lock the aircraft seat 102 in a select position. For example, the helix vertical adjustment system 800 may include a ring brake locking mechanism 810.

The helix vertical adjustment system 800 may include one or more stabilizer rods 810. For example, the helix vertical adjustment system 800 may include one or more vertical stabilizer rods 606 configured to couple to a portion of the base assembly (e.g., fixed base rails) and a portion of the locking mechanism 808. It is noted that the one or more stabilizer rods 606 may be configured to provide additional rigidity for the adjustment system 800.

It is noted herein "vertical" may be understood as being defined with respect to a z-axis as illustrated in the Figures. In addition, it is noted herein "horizontal" may be understood as being defined with respect to an x-axis or a y-axis as illustrated in the Figures.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A vertical adjustment system for an aircraft seat, comprising:
    a swivel assembly, the swivel assembly comprising:
        a swivel plate including integrally-formed connecting members, the integrally-formed connecting members configured to couple to a portion of the aircraft seat; and
        a swivel mechanism configured to rotate the aircraft seat about a central axis of the aircraft seat;
    a tracking assembly, the tracking assembly comprising:
        a plurality of slide tubes configured to slide the aircraft seat one of side-to-side or fore-and-aft;
        a plurality of slide bearings configured to receive a portion of the plurality of slide tubes; and
        a tracking plate coupled to the plurality of slide bearings; and
    an actuation assembly, the actuation assembly comprising:
        an actuator configured to provide a vertical height adjustment for the aircraft seat, the actuator configured to arrest relative motion between a base assembly of the aircraft seat and an upper portion of the aircraft seat;
        a release mechanism, the release mechanism configured to couple to a rotary portion of the swivel plate, the release mechanism configured to release the actuator;
        a plurality of vertical stabilizer rods coupled to a portion of the tracking plate; and
        a pillow block assembly, the pillow block assembly comprising:
            a plurality of pillow blocks coupled to a portion of the swivel plate; and
            a plurality of rollers coupled to a portion of the plurality of pillow blocks, the plurality of rollers configured to receive a portion of the plurality of stabilizer rods, the plurality of rollers configured to provide stability along the vertical stabilizer rods when the actuator provides the vertical height adjustment.

2. The system of claim 1, wherein the swivel mechanism comprises:
    a first inner ring;
    an additional inner ring, the swivel plate positioned between the first inner ring and the additional inner ring;
    one or more ball bearings, the one or more ball bearings positioned between the swivel plate and at least one of the first inner ring or the additional inner ring; and
    a locking ring, the locking ring include one more teeth to arrest the relative motion between the swivel plate and at least one of the first inner ring or the additional inner ring.

3. The system of claim 1, wherein the swivel mechanism comprises:
    a helix swivel mechanism, the helix swivel mechanism including a shaft, the shaft including one or more helical protrusions; and
    a locking mechanism configured to engage the helix swivel mechanism to lock the aircraft seat in a select position.

4. The system of claim 1, wherein the release mechanism comprises:
    a pull lever coupled to a portion of the swivel plate; and
    one or more pull cables coupled to a portion of the pull lever, the one or more pull cables configured to pull the pull lever to release the actuator.

5. The system of claim 1, wherein the integrally-formed connecting members are configured to couple to a portion of seat frame of the aircraft seat.

6. The system of claim 5, wherein the tracking assembly is configured to couple to a portion of the base assembly of the aircraft seat.

7. The system of claim 1, wherein the integrally-formed connecting members are configured to couple to a portion of base assembly of the aircraft seat.

8. The system of claim 7, wherein the tracking assembly is configured to couple to a portion of the base assembly of the aircraft seat.

9. An aircraft seat, comprising:
    a base assembly couplable to a floor of an aircraft;
    a vertical adjustment system; and
    a seat frame coupled to the base assembly via the vertical adjustment system, the vertical adjustment system comprising:
        a swivel assembly, the swivel assembly comprising:
            a swivel plate including integrally-formed connecting members, the integrally-formed connecting members configured to couple to a portion of the aircraft seat;
            a swivel mechanism configured to rotate the aircraft seat about a central axis of the aircraft seat;
        a tracking assembly, the tracking assembly comprising:
            a plurality of slide tubes configured to slide the aircraft seat one of side-to-side or fore-and-aft;
            a plurality of slide bearings configured to receive a portion of the plurality of slide tubes; and
            a tracking plate coupled to the plurality of slide bearings; and
        an actuation assembly, the actuation assembly comprising:
            an actuator configured to provide a vertical height adjustment for the aircraft seat, the actuator configured to arrest relative motion between the base assembly of the aircraft seat and an upper portion of the aircraft seat;
            a release mechanism, the release mechanism configured to couple to a rotary portion of the swivel plate, the release mechanism configured to release the actuator;
            a plurality of vertical stabilizer rods coupled to a portion of the tracking plate; and a pillow block assembly, the pillow block assembly comprising:
  a plurality of pillow blocks coupled to a portion of the swivel plate; and
  a plurality of rollers coupled to a portion of the plurality of pillow blocks, the plurality of rollers configured to receive a portion of the plurality of stabilizer rods, the plurality of rollers configured to provide stability along the vertical stabilizer rods when the actuator provides the vertical height adjustment.

10. The aircraft seat of claim 9, wherein the swivel mechanism comprises:
  a first inner ring;
  an additional inner ring, the swivel plate positioned between the first inner ring and the additional inner ring;
  one or more ball bearings, the one or more ball bearings positioned between the swivel plate and at least one of the first inner ring or the additional inner ring; and
  a locking ring, the locking ring include one more teeth to arrest the relative motion between the swivel plate and at least one of the first inner ring or the additional inner ring.

11. The aircraft seat of claim 9, wherein the swivel mechanism comprises:
  a helix swivel mechanism, the helix swivel mechanism including a shaft, the shaft including one or more helical protrusions; and
  a locking mechanism configured to engage the helix swivel mechanism to lock the aircraft seat in a select position.

12. The aircraft seat of claim 9, wherein the integrally-formed connecting members are configured to couple to a portion of seat frame of the aircraft seat.

13. The aircraft seat of claim 12, wherein the tracking assembly is configured to couple to a portion of the base assembly of the aircraft seat.

14. The aircraft seat of claim 9, wherein the integrally-formed connecting members are configured to couple to a portion of the base assembly of the aircraft seat.

15. The aircraft seat of claim 14, wherein the tracking assembly is configured to couple to a portion of the base assembly of the aircraft seat.

* * * * *